(12) United States Patent
Davis

(10) Patent No.: US 8,152,871 B2
(45) Date of Patent: Apr. 10, 2012

(54) FUEL SOURCE FOR ELECTROCHEMICAL CELL

(75) Inventor: Stuart M. Davis, Norfolk, MA (US)

(73) Assignee: Honeywell International Inc., Morristown, NJ (US)

(*) Notice: Subject to any disclaimer, the term of this patent is extended or adjusted under 35 U.S.C. 154(b) by 848 days.

(21) Appl. No.: 12/194,430

(22) Filed: Aug. 19, 2008

(65) Prior Publication Data
US 2010/0047640 A1    Feb. 25, 2010

(51) Int. Cl.
*C10L 1/12* (2006.01)
(52) U.S. Cl. .............................. 44/457; 44/354; 429/400
(58) Field of Classification Search .................... 44/457, 44/354; 429/400
See application file for complete search history.

(56) References Cited

U.S. PATENT DOCUMENTS

| 7,354,461 | B2 * | 4/2008 | Nemeth et al. .................. 44/265 |
| 2006/0196112 | A1 * | 9/2006 | Berry et al. ..................... 44/550 |
| 2007/0068071 | A1 * | 3/2007 | Kelly et al. ..................... 44/905 |

FOREIGN PATENT DOCUMENTS

| DE | 2127046 | * | 11/1976 |
| RU | 1794887 | * | 2/1993 |

* cited by examiner

*Primary Examiner* — Cephia D Toomer
(74) *Attorney, Agent, or Firm* — Schwegman, Lundberg & Woessner P.A.

(57) ABSTRACT

Embodiments of the invention relate to a fuel source including a chemical hydride and at least one reactive metal source selected from the group consisting of a reactive metal, a reactive metalloid and a combination thereof.

17 Claims, 2 Drawing Sheets

FUEL SOURCE FOR ELECTROCHEMICAL CELL

BACKGROUND

Hydrogen fuel cells have been proposed utilizing a reactive chemical hydride as a fuel source. Normally the chemical hydride is reacted with water to liberate hydrogen gas which then is consumed by the fuel cell. Other protonic solvents besides water (e.g. alcohols, organic acids) may also be employed. Some chemical hydrides currently used include $CaH_2$, $NaBH_4$ and $LiAlH_4$. Other reactive metal hydrides which could also be used are $NaAlH_4$, $KAlH_4$ and $MgAlH_4$.

In such a fuel cell system, a housing is often employed to contain the fuel and reaction products in order to protect the fuel from reacting with atmospheric moisture when the fuel cell is not in service and to collect the generated hydrogen so it can be conducted to the fuel cell. It is desirable to include a maximum quantity of fuel in a housing of a given volume in order to achieve the highest possible hydrogen output and the longest possible running time for the fuel cell. However, the disadvantage of packing fuel too tightly into the housing is that the access of water to some parts of the fuel becomes restricted and the rate of hydrogen generation is then limited by the slow diffusion of water into the bulk of the fuel. As solid reaction products accumulate they may further restrict water access, choking off the reaction. Ultimately the reaction may reach a standstill and fuel utilization will be incomplete.

Typically the chemical hydride fuel is compressed into cylindrical pellets and these are then packed or recompressed into a cylindrical fuel holder. The fuel holder may be the same container as the housing or the fuel holder may be a separate structure which is located inside the housing. The fuel holder may contain perforations to permit water ingress through the fuel holder walls into the outer surface of the pellet, from where water can then diffuse radially inward through the pellet thickness. The fuel pellet itself may have radial holes or channels to facilitate water permeation into the depth of the pellet. Alternatively, the fuel pellet may have a hollow cylindrical core to permit water permeation into the hollow core from where the water diffuses radially outward, through the pellet thickness. Both of these pellet configurations may be combined so that water diffusion can occur simultaneously inwardly and outwardly along the pellet radius. But, as the pellet radius is increased, it becomes more and more difficult for water to reach the interior portions of the pellet which lie at some distance from the inner or outer surfaces.

To overcome such problems, the pellet density inside the fuel container may be decreased, leaving open voids and connected channels for water diffusion. This can be accomplished by simply loading loose powder or small chunks of chemical hydride into the fuel container and leaving sufficient void space. Porosity builders such as zeolites, perlites or hollow fibers may be mixed with the hydride powder and then the mixture may be compacted to form pellets.

Both of these approaches create voids and channels which can improve utilization efficiency and the hydrogen production rate. However these approaches inevitably reduce the total quantity of chemical hydride contained within a housing of a given volume and consequently the quantity of hydrogen which can be generated from that fuel.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
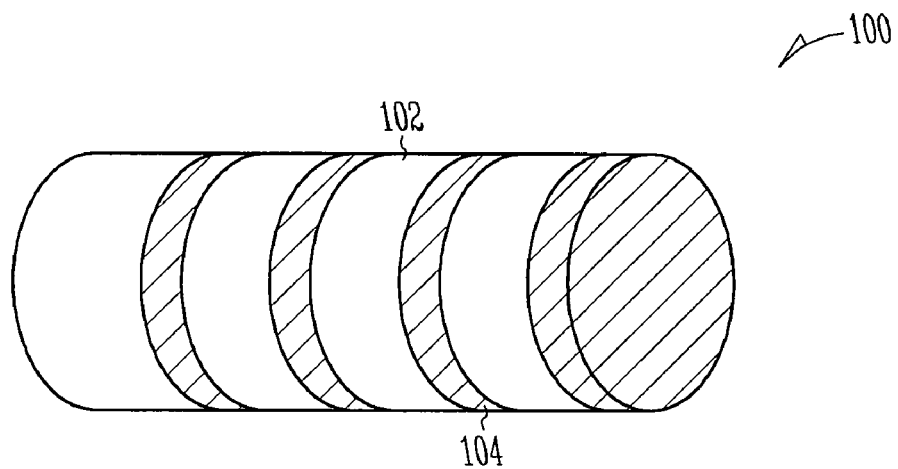
FIG. 1 illustrates a perspective view of a cylindrical fuel source, according to some embodiments.

Embodiments of the invention relate to a fuel source including a chemical hydride and at least one reactive metal source selected from the group consisting of a reactive metal, a reactive metalloid and a combination thereof.

Embodiments of the present invention also relate to a method of making a fuel source. The method includes contacting a chemical hydride and reactive metal source. A method of using a fuel source is also described. The method includes reacting a fuel source with a reactive solvent sufficiently to generate hydrogen and by-products and reacting the by-products and solvent with the reactive metal source, sufficiently to generate hydrogen

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate principally to a fuel source for an electrochemical cell, such as a fuel cell. However, such a fuel source may also be employed for other purposes such as supplying fuel to a combustion engine, to a heating device, to a cooling device (e.g. a device operating with a Kelvinator type of refrigeration cycle), to a flame employed for lighting, to a flame employed as part of an analytical instrument, to a flame employed in a cutting or welding torch and for other devices which consume a fuel either via a flame or by catalytic oxidation to produce a useful effect. The fuel source may be a mixture of chemical hydride and one or more reactive metals, reactive metalloids or combinations thereof (herein referred to as a "reactive metal source").

In what follows, the term "reactive metal" or "reactive metal source" shall also be construed to include the class of "reactive metalloids" such as boron or silicon, which are capable of generating hydrogen gas when reacted with an aqueous alkaline solution.

The chemical hydride reacts with solvent in a primary reaction to produce hydrogen and alkaline by-products. The reactive metals react in a secondary reaction with these alkaline by-products, to produce more hydrogen.

Additionally, since the reactive metal source of the embodiments of this invention is substantially denser then their own reaction by-products, a significant expansion occurs as a result of the secondary reaction of active metal with alkaline by-products of the primary reaction. The expansion caused by this secondary reaction involving particles or bodies of active metal exerts pressure on the surrounding matrix of chemical hydride, wedging the matrix open and causing it to crack or fissure. These cracks or fissures will contain the porous reaction products of the active metal. Cracks or fissures, whether empty or containing porous reaction products, act as conduits for water or water vapor and promote the penetration of additional water into the metal hydride body, facilitating the primary hydrogen producing reaction of metal hydride with solvent. So, instead of solid by-products of the chemical hydride hindering the further reaction of the hydride and a solvent these alkaline by-products interact with the reactive metal and produce additional hydrogen. This secondary reaction also produces cracks or fissures in the hydride pellet, further promoting the primary hydrogen producing reaction.

The reactive metal source may be uniformly or randomly placed in a fuel source, such as in uniformly distributed layers or strips of a compressed pellet or in randomly distributed particles or bodies. The presence of the reactive metal particles, bodies or layers increases the utilization of the chemical hydride and prevents the otherwise gradual decrease in hydrogen production rate as the fuel source reacts. The fuel source may remain tightly packed without decreasing the rate of hydrogen production due to solvent access.

Figure 2:
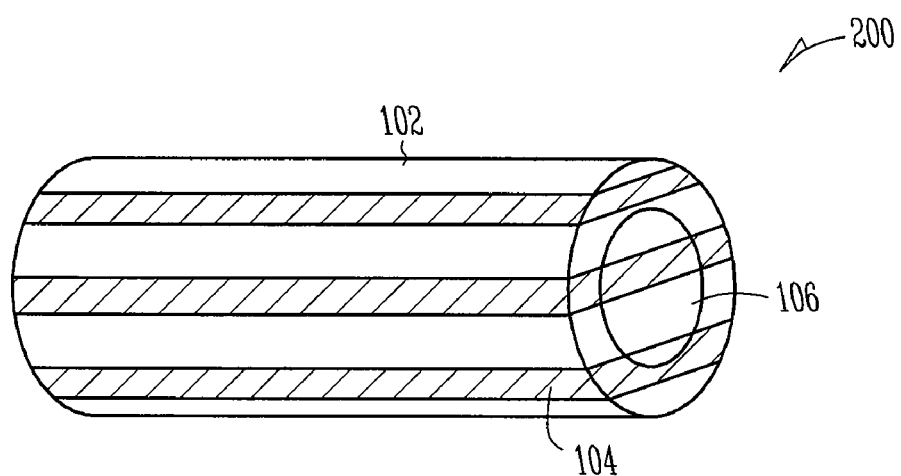
FIG. 2 illustrates a perspective view of a hollow cylindrical fuel source, according to some embodiments.

Referring to FIG. 1, a perspective view 100 of a cylindrical fuel source is shown, according to some embodiments. In one example, the fuel source may be formed in a solid pellet and include a chemical hydride 102 and one or more reactive metals 104 or reactive metal source. The fuel source may alternatively be a hollow cylinder 106 (see view 200 of FIG. 2). The reactive metal source 104 may be positioned in evenly or unevenly placed layers, either parallel (see FIG. 2) or perpendicular (see FIG. 1) to the length of the cylindrical pellet. In some embodiments, the reactive metal source 104 may be a powder or a heterogeneous mixture of particles or bodies with the hydride 102, for example.

The reactive metal source 104 may consist of one or more of aluminum, boron, silicon, strontium, barium, titanium, hafnium, zinc, gallium, indium, calcium or a combination thereof. In addition alloys of such metals or metalloids, inter-metallic compounds formed from such metals or metalloids and alloys or inter-metallic compounds formed with aluminum and calcium may also be present alone or in combination. Examples include $CaB_2$, $CaSi_2$, $TiB_2$ Al:Si alloy (88:12), $B_6Si$, $Ti_3Al$, $TiAl$, $TiAl_3$. The reactive metal source 104 may be present in about 1 vol % to about 50 vol %, about 2 vol % to about 30 vol % or about 5 vol % to about 20 vol %, for example. Additionally, low hydrogen overvoltage catalysts may be added to the reactive metal source 104, such as added to zinc, which is inherently slow to react and produce hydrogen. The reactive metal source 104 may be added as powder, chunks, lumps, fibers, porous foam, hollow fibers, crystals, flakes, rods, tubes, metal foil or a combination thereof. The reactive metal source 104 may be evenly spaced throughout the fuel source structure or may be randomly or heterogeneously positioned.

The hydride 102 utilized may be $CaH_2$, $NaBH_4$, $LiAlH_4$, $NaAlH_4$, $KAlH_4$, $MgAlH_4$ or combinations thereof. In addition to the fuel source shaped as a cylinder, other shapes may be utilized. Such shapes include a disc, cube, prism or sphere. Other geometric features may be additionally imposed on these basic shapes, such as longitudinal or radial channels, grooves, concave or convex features, etc.

Figure 3:
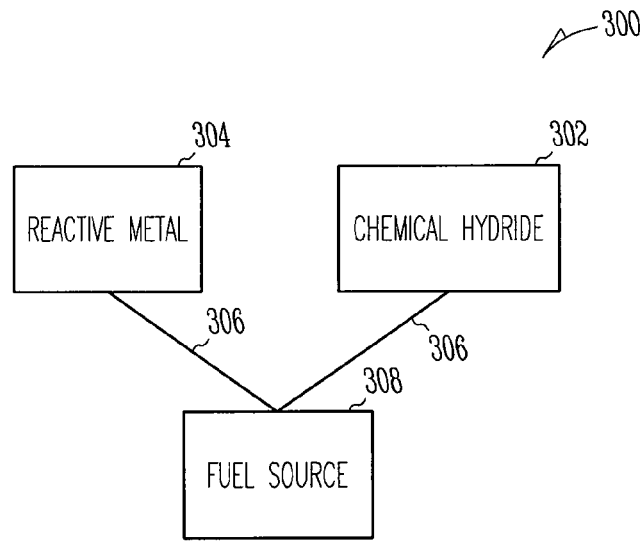
FIG. 3 illustrates a block flow diagram of a method of making a fuel source, according to some embodiments

Referring to FIG. 3, a block flow diagram 300 of a method of making a fuel source is shown, according to some embodiments. A reactive metal source 304 may be contacted 306 with a chemical hydride 302 to provide a fuel source 308.

Contacting 306 may include mixing, compressing, physically contacting or chemically contacting, for example. A fuel source may be formed as a compacted cylinder of chemical hydride 302 but also contain a quantity of a reactive metal 304, such as aluminum or calcium. The reactive metal 304 may be added or contacted 306 as a powder, in chunks, as flakes, as fibers, as porous foams, as hollow fibers or tubes or as pieces of metal foil. The metal component may be distributed either randomly or, in the case of fibers or foil may be oriented parallel to the radial planes of the fuel pellet. In one embodiment, layers of metal foil may be embedded at regularly spaced distances along the central axis of the pellet and the foil layers lie in planes oriented in the radial direction. The reactive metal may be positioned in any arrangement, such that alkaline by-products formed from the primary reaction (e.g. hydroxide compounds) can come into contact with the reactive metals for further reaction and hydrogen generation.

Figure 4:
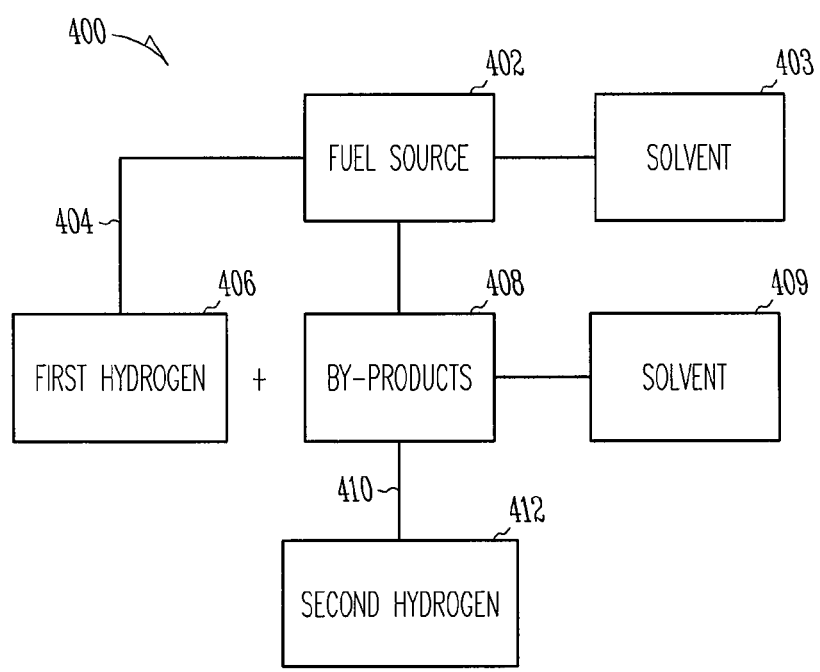
FIG. 4 illustrates a block flow diagram of a method of using a fuel source, according to some embodiments

Referring to FIG. 4, a block flow diagram 400 of a method of using a fuel source is shown, according to some embodiments. A fuel source 402 and a solvent 403 may be reacted 404 to provide a first hydrogen 406 and by-products 408. The by products may include some unused reactive metal. The by-products 408 and solvent 409 (e.g., water) may be reacted 410 with a reactive metal, sufficiently to provide a second hydrogen 412.

In one example, the fuel source 402 may be $LiAlH_4$ (MW=37.94, density=0.917 g/cm3). When contacted with water, the hydrolysis reaction can be written as:

$$2LiAlH_4 + 5H_2O \rightarrow 2LiOH + Al_2O_3{*} + 8H_2$$

*$Al_2O_3$ represents all possible aluminum oxides or hydroxides (by-products 408) which may result from this reaction when it is conducted at different reaction rates and temperatures and with different limiting amounts of $H_2O$ present.

8 moles of $H_2$ occupy 179.2 std liters
1 g of $LiAlH_4$ yields 2.362 std liters $H_2$
1 cm3 $LiAlH_4$ yields 2.165 std liters $H_2$
1 cm3 $LiAlH_4$ yields 0.82 to 1.21 cm3 solid reaction products (LiOH, aluminum oxide and/or aluminum hydroxide). The volume of final products will depend upon which Al compounds are formed:

| | |
|---|---|
| AlOOH diaspore | 3.3-3.5 g/cm3 |
| AlOOH boehmite | 3.01 g/cm3 |
| $Al(OH)_3 \cdot xH_2O$ bayerite | 2.53 g/cm3 |

| | |
|---|---|
| Al(OH)$_3$·xH$_2$O hydrargillite | 2.42 g/cm3 |
| Al(OH)$_3$·xH$_2$O gibbsite | 2.35 g/cm3 |

As the diffusion of H$_2$O through the fuel source (e.g., pellet) thickness slows down, some H$_2$O may be captured by the LiOH and a concentrated solution of LiOH may be formed. The vapor pressure of the saturated LiOH solution is less than that of pure H$_2$O and the radial diffusion of H$_2$O vapor into the depth of the fuel source may slow further.

Concentrated aqueous LiOH (i.e., by-product 408) reacts with metals such as Al and Ca to generate H$_2$ gas. With Al, the LiOH is needed to dissolve surface oxides and to activate the metal. With Ca, LiOH is not needed to activate the surface, but the reaction of Ca with H$_2$O will occur whether LiOH is present or not.

The reaction with Al (AW=26.98, density=2.702 g/cm3) is:

$$2Al+3H_2O \rightarrow Al_2O_3+3H_2$$

3 moles of H$_2$ occupy 67.2 std liters
1 g Al yields 1.245 std liters H$_2$
1 cm3 Al yields 3.364 std liters H$_2$ By replacing a fraction of the LiAlH$_4$ volume, e.g. 1% to 50%, with an equal volume of Al metal, the theoretical quantity of available H$_2$ gas may be increased.

The volume of reaction product produced by the conversion of Al to Al$_2$O$_3$* is at least 1.3 times that of the starting Al metal, based on the maximum published density for diaspore Al$_2$O$_3$ of 3.5 g/cm3. Lower density Al$_2$O$_3$* products will result in a larger volume expansion. In the extreme case of gibbsite Al$_2$O$_3$, 1 cm3 of Al yields 2.715 cm3 of gibbsite or 2.72 times the expansion.

The expansion produced by the formation of Al$_2$O$_3$* from Al is therefore greater than that produced by the reaction of LiAlH$_4$ to produce solid LiOH and Al$_2$O$_3$ and may be even greater than that expected if LiOH solution is a final product. The greater expansion produced by the conversion of Al metal to Al$_2$O$_3$* will cause the LiAlH$_4$ pellet (i.e. fuel source) to crack, creating porosity which will favor H$_2$O diffusion. Thus, more LiAlH$_4$ fuel will be exposed and will react to form LiOH solution which will then react with Al metal to produce more H$_2$ and Al$_2$O$_3$. This will result in further expansion and pellet cracking etc.

With Ca (AW=40.08, density=1.55 g/cm3) the reaction is:

$$Ca+2H_2O \rightarrow Ca(OH)_2+H_2$$

1 mole of H$_2$ occupies 22.4 std liters
1 g Ca yields 0.56 std liters H$_2$
1 cm3 Ca yields 0.87 std liters H$_2$
1 cm3 Ca yields 1.225 std liters Ca(OH)$_2$ Also with regard to volume expansion, Ca gives about 1.23 times expansion as Ca(OH)$_2$ is formed, vs. 1.3 times to 2.7 times for the conversion of Al to Al$_2$O$_3$*. In addition, Ca(OH)$_2$ is only slightly soluble in aqueous LiOH solution whereas Al$_2$O$_3$ is far more soluble. Hence, the reaction of Al with LiOH solution is likely to go at a faster rate and/or further to completion than the reaction of Ca to form Ca(OH)$_2$.

In one example, a cylindrical fuel pellet may be pressed from about 85 vol % LiAlH$_4$ and 15 vol % Al foil. The Al foil layers may be aligned perpendicular to the central axis of the pellet and the foil layers may be distributed evenly along this axis. In some embodiments, the cylindrical pellet is solid or it may be a hollow cylinder, with a cavity aligned along its central axis.

The fuel source may be utilized in an electrochemical fuel system, such as a system including one or more fuel cells configured to utilize the fuel generated from the fuel source. The fuel source may provide a source of hydrogen fuel for electrochemical cells to operate, such as in portable electronic devices, for example.

What is claimed is:

1. A fuel source, comprising:
   a chemical hydride that reacts with a reactive solvent to produce hydrogen and alkaline by-products; and
   at least one reactive metal source selected from the group consisting of a reactive metal, a reactive metalloid, or a combination thereof that reacts with the alkaline by-products, to produce more hydrogen; and
   wherein the reactive metal source comprises layers, each of which is separated by a layer of chemical hydride.

2. The fuel source of claim 1, wherein the chemical hydride and reactive metal source comprise a pellet.

3. The fuel source of claim 2, wherein the pellet is substantially in the form of a cylinder, disc, cube, prism or sphere.

4. The fuel source of claim 2, wherein the pellet is hollow.

5. The fuel source of claim 1, wherein the reactive metal source comprises powder, chunks, lumps, fibers, flakes, porous foam, hollow fibers, crystals, flakes, rods, tubes, metal foil or a combination thereof.

6. The fuel source of claim 1, wherein the fuel source comprises geometric features.

7. The fuel source of claim 6, wherein the geometric features comprise longitudinal channels, radial channels, grooves, concave features or convex features.

8. The fuel source of claim 1, further comprising a catalyst.

9. The fuel source of claim 1, wherein the reactive metal source comprises aluminum, boron, silicon, strontium, barium, titanium, hafnium, zinc, gallium, indium, calcium, alloys of the above metals, compounds of the above metals or a combination thereof.

10. The fuel source of claim 1, wherein the chemical hydride comprises CaH$_2$, NaBH$_4$, LiAlH$_4$, NaAlH$_4$, KAlH$_4$, MgAlH$_4$ or combinations thereof.

11. A method of making a fuel source, comprising:
    contacting a chemical hydride and with one or more of a reactive metal, reactive metalloid or a combination thereof, wherein the reactive metal source comprises layers, each of which is separated by a layer of chemical hydride.

12. The method of claim 11, wherein contacting comprises mixing, compressing or a combination thereof.

13. A method of using a hydrogen fuel source, comprising:
    reacting a hydrogen fuel source with a reactive solvent, sufficient to generate hydrogen and alkaline by-products, the hydrogen fuel source including:
    a chemical hydride;
    a reactive metal, reactive metalloid or combination thereof; and
    reacting the alkaline by-products and solvent with the reactive metal, reactive metalloid or a combination thereof sufficient to generate more hydrogen;
    wherein the reactive metal source comprises layers, each of which is separated by a layer of chemical hydride.

14. The method of claim 13, wherein the reactive solvent comprises water.

15. The method of claim 13, wherein the by-products comprises a hydroxide compound.

16. An electrochemical cell system, comprising:

a hydrogen fuel source, including:

a chemical hydride that reacts with a reactive solvent to produce hydrogen and alkaline by-products;

at least one reactive metal source selected from the group consisting of a reactive metal, a reactive metalloid and a combination thereof that reacts with the alkaline by-products, to produce more hydrogen;

wherein the reactive metal source comprises layers, each of which is separated by a layer of chemical hydride; and one or more electrochemical cells, configured to utilize the hydrogen fuel generated from the hydrogen fuel source for operation.

17. The electrochemical cell system of claim 16, wherein the one or more electrochemical cells comprise fuel cells.

* * * * *